United States Patent
Meguro et al.

(10) Patent No.: US 6,890,646 B2
(45) Date of Patent: *May 10, 2005

(54) MAGNETIC RECORDING MEDIUM

(75) Inventors: Katsuhiko Meguro, Odawara (JP); Masatoshi Takahashi, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 101 days.

This patent is subject to a terminal disclaimer.

(21) Appl. No.: 10/413,483

(22) Filed: Apr. 15, 2003

(65) Prior Publication Data

US 2003/0232217 A1 Dec. 18, 2003

(30) Foreign Application Priority Data

Apr. 16, 2002 (JP) ........................................ 2002-113869

(51) Int. Cl.$^7$ .............................................. G11B 5/733
(52) U.S. Cl. ....................... 428/323; 428/324; 428/328; 428/329; 428/331; 428/694 BA; 428/694 BH; 428/694 SG
(58) Field of Search ................................. 428/323, 324, 428/328, 329, 331, 694 BA, 694 BH, 694 SG

(56) References Cited

U.S. PATENT DOCUMENTS

| | | | | |
|---|---|---|---|---|
| 4,786,558 | A | * | 11/1988 | Sumiya et al. ............... 428/454 |
| 5,932,634 | A | * | 8/1999 | Hosokawa et al. ......... 523/209 |
| 6,239,195 | B1 | * | 5/2001 | Suzuki et al. ............... 523/204 |
| 6,339,121 | B1 | * | 1/2002 | Rafailovich et al. ........ 524/445 |
| 6,432,503 | B2 | * | 8/2002 | Aonuma et al. ............ 428/65.3 |
| 6,521,361 | B2 | * | 2/2003 | Ejiri et al. ............ 428/694 BN |
| 6,548,587 | B1 | * | 4/2003 | Bagrodia et al. ........... 524/445 |
| 6,586,500 | B2 | * | 7/2003 | Bagrodia et al. ........... 523/209 |

FOREIGN PATENT DOCUMENTS

JP      2000-336186      *   5/2000

* cited by examiner

Primary Examiner—Stevan A. Resan
(74) Attorney, Agent, or Firm—Sughrue Mion, PLLC

(57) ABSTRACT

Provided is a particulate magnetic recording medium for high-density recording maintaining a high C/N ratio achieving good surface recording density, exhibiting little dropout, and having a low error rate. The magnetic recording medium comprises a nonmagnetic layer comprising a nonmagnetic powder and a binder and a magnetic layer comprising a ferromagnetic powder and a binder in this order on at least one surface of a nonmagnetic support. Said nonmagnetic support comprises a filler having an aspect ratio ranging from 50 to 10,000 and a thickness ranging from 0.5 to 5 nm.

9 Claims, No Drawings

MAGNETIC RECORDING MEDIUM

FIELD OF THE INVENTION

The present invention relates to a magnetic recording medium having excellent electromagnetic characteristics and running durability.

BACKGROUND OF THE INVENTION

As personal computers, workstations, and the like have become widespread in recent years, a large amount of research has been conducted into the magnetic tapes (known as back-up tapes) that are employed as external recording media for recording computer data. In the development of magnetic tapes for such uses, particularly as computers have decreased in size and increased in information processing capability, there has been a strong demand for increased recording capability to increase recording capacity and achieve size reduction. In the area of magnetic disks, as well, the rapid development of information technology is spawning a demand for the development of magnetic disks of ever greater density and capacity.

In the magnetic recording media developed thus far, a magnetic layer comprising a ferromagnetic hexagonal ferrite powder in the form of iron oxide, Co-modified iron oxide, or $CrO_2$ dispersed in a binder that is coated on a nonmagnetic support has been widely employed. In these, the use of ferromagnetic metal powder and ferromagnetic hexagonal ferrite powder as magnetic powders is known to afford good high-density recording characteristics. For example, in the case of magnetic disks, 10 MB MF-2TD and 21 MB MF-2SD high-capacity disks employing ferromagnetic metal powder with good high-density recording characteristics are known. High-capacity disks employing ferromagnetic hexagonal ferrite powder in the form of 4 MB MF-2ED and 21 MB flopticals are also known. However, today, with sharp increases in the quantity of data being handled, even these magnetic disks do not afford adequate recording capacity and there is demand for magnetic disks of even greater capacity.

In the field of magnetic tapes, technologies of reducing the layer thickness of magnetic tapes to permit high-density recording are advancing. Numerous magnetic tapes having a magnetic layer thickness of equal to or less than 2 $\mu$m have appeared. With the high densification of magnetic recording media, a demand for greater coating smoothness has come, and the trend in magnetic material has been toward microparticles. However, when a magnetic layer of equal to or less than 2 $\mu$m in thickness is directly coated on a support, the surface of the magnetic layer is affected by additives in the magnetic layer such as abrasives and carbon, aggregates of magnetic powder, and the nonmagnetic support, rendering the magnetic layer rough and prone to exhibit deterioration in electromagnetic characteristics and dropout.

One means of solving this problem is to provide a nonmagnetic layer beneath the magnetic layer and thinly apply a highly concentrated magnetic coating liquid by a simultaneous multilayer coating method (Japanese Unexamined Patent Publication (KOKAI) Showa Nos. 63-191315 and 63-187418). The use of such simultaneous multilayer coating methods yields good electromagnetic characteristics even in a particulate magnetic recording medium having a thin magnetic layer.

However, the surface state of the nonmagnetic support in a magnetic recording medium having a thin magnetic layer greatly affects nonmagnetic layers and magnetic layers positioned over them. Thus, when employing a support of poor surface smoothness, the problem of reduced running durability occurs in addition to problems such as reduced electromagnetic characteristics and dropout, necessitating further improvement.

To improve the support, Japanese Unexamined Patent Publication (KOKAI) Heisei No. 6-234907 describes the specification of the size of the filler incorporated into the support, and Japanese Unexamined Patent Publication (KOKAI) Heisei No. 8-187774 and Japanese Unexamined Patent Publication (KOKAI) Nos. 2000-57558 and 2000-336186 describe the use of clay minerals as the fillers incorporated into the support. However, none of the techniques described in the above-cited art is capable of improving electromagnetic characteristics and durability in a particulate magnetic recording medium having a multilayer-configuration with a thin magnetic layer and a nonmagnetic layer.

Accordingly, it is an object of the present invention is to provide a particulate magnetic recording medium for high-density recording maintaining a high C/N ratio achieving good surface recording density, exhibiting little dropout, and having a low error rate.

SUMMARY OF THE INVENTION

The present inventors conducted extensive research, resulting in the discovery that the above-stated object was achieved by specifying the thickness and aspect ratio of the filler incorporated into the nonmagnetic support to within prescribed ranges; the present invention was devised on that basis.

That is, the object of the present invention mentioned above is achieved by;

a magnetic recording medium comprising a nonmagnetic layer comprising a nonmagnetic powder and a binder and a magnetic layer comprising a ferromagnetic powder and a binder in this order on at least one surface of a nonmagnetic support, wherein said nonmagnetic support comprises a filler having an aspect ratio ranging from 50 to 10,000 and a thickness ranging from 0.5 to 5 nm.

In the above-mentioned magnetic recording medium of the present invention, the ferromagnetic powder comprised in the magnetic layer is preferably a ferromagnetic hexagonal ferrite powder having an average plate diameter ranging from 5 to 40 nm or a ferromagnetic metal powder having an average major axis length ranging from 20 to 100 nm.

The magnetic recording medium of the present invention is described in greater detail below.

[Nonmagnetic Support]

In the magnetic recording medium of the present invention, the aspect ratio of the filler comprised in the nonmagnetic support ranges from 50 to 10,000, preferably from 60 to 5,000, and more preferably from 70 to 1,000. Here, the 'aspect ratio' refers to the average particle diameter/thickness ratio of the average particle diameter to the thickness of the filler. At an aspect ratio of less than 50, no effect is achieved by the plate-shaped particles, and at an aspect ratio exceeding 10,000, the surface of the support becomes rough.

In the magnetic recording medium of the present invention, the thickness of the filler ranges from 0.5 to 5 nm, preferably from 0.7 to 4 nm, and more preferably from 0.8 to 2 nm. At a thickness of less than 0.5 nm, it cannot be present as a plate-shaped particle, and at a thickness exceeding 5 nm, the surface of the support becomes rough.

The average particle diameter of the above-mentioned filler desirably ranges from 25 to 10,000 nm. Within this range, effects are achieved by plate-shaped particles and a support with good surface smoothness can be achieved.

The material of the filler incorporated into the nonmagnetic support in the present invention is not specifically limited; any material having the above-stated thickness and aspect ratio may be employed. Specifically, clay minerals, swelling minerals, and the like may be employed as it is or coated with organic compounds.

When employing a clay mineral or a swelling mineral with an organic compound as a filler, the aspect ratio and the thickness of the filler comprised in the nonmagnetic support in the present invention may be adjusted in the course of coating the clay mineral or the like with an organic compound by, for example, dispersing the particles with a dispersing device which can impart high shear, such as a homomixer.

A compound (referred to hereinafter as an "organic onium-treated compound") such as a clay mineral or swelling mineral that has been subjected to the action of an organic onium ion is desirably employed as the filler incorporated into the nonmagnetic support in the present invention.

Clay minerals, swelling minerals, and the like that have been treated with organic onium ions have completely different structures from the micrometer-sized, multilayer aggregate structures of untreated clay minerals, swelling minerals, and the like. That is, when the clay minerals and swelling minerals are treated with organic onium ions, organic onium ions having affinity to resins are incorporated between the layers. Thus, the areas between the layers of the clay minerals, swelling minerals, and the like that have been treated with organic onium ions are widened, and they can be dispersed in the resin as extremely fine, independent thin flakes, exhibiting extremely good dispersibility. When organic onium-treated compounds in particular are employed as fillers having the above-stated thickness and aspect ratio in the present invention, thin flake-like fillers can be well dispersed and a nonmagnetic support with good surface smoothness can be obtained.

Examples of the above-mentioned clay mineral, swelling mineral and the like are smectite clay, swelling mica, and swelling vermiculite primarily comprised of tetrahedral sheets of silicon oxide and octahedral sheets of metal hydroxides.

The smectite clay, which may be a natural or synthetic compound, is denoted by the general formula: $X_{0.2-0.6}Y_{2-3}Z_4O_{10}(OH)_2 \cdot nH_2O$ (where X is one or more members selected from the group consisting of K, Na, ½ Ca, and ½ Mg; Y is one or more members selected from the group consisting of Mg, Fe, Mn, Ni, Zn, Li, Al, and Cr; and Z is one or more members selected from the group consisting of Si and Al; with $H_2O$ denoting water molecules bonded to interlayer ions and n varying greatly with interlayer ions and the relative humidity). Specific examples of smectite clay are: montmorillonite, beidellite, nontronite, saponite, iron saponite, hectorite, sorconite, stibnite, and bentonite, as well as substitution products, derivatives, and mixtures thereof.

The swelling mica, which may be a natural or synthetic compound, is denoted by the general formula: $X_{0.5-1.0}Y_{2-3}(Z_4O_{10})(F,OH)_2$ (where X is one or more members selected from the group consisting of Li, Na, K, Rb, Ca, Ba and Sr; Y is one or more members selected from the group consisting of Mg, Fe, Ni, Mn, Al, and Li; and Z is one or more members selected from the group consisting of Si, Ge, Al, Fe, and B). The compounds have the property of swelling in water, in a polar solvent having any degree of compatibility with water, and in a mixed solvent of water and such a polar solvent. Examples are Li-type tenorite, Na-type tenorite, Li-type tetrasilicon mica, and Na-type tetrasilicon mica, as well as substitution products, derivatives, and mixtures thereof. Swelling vermiculite includes both trioctahedral and dioctahedral forms denoted by the general formula: $(Mg, Fe, Al)_{2-3}(Si_{4-x}Al_x)O_{10}(OH)_2 \cdot (M^+, \frac{1}{2} M^{2+})_x \cdot nH_2O$ (where M denotes the exchangeable ion of an alkali or alkaline earth metal such as Mg or Na, X=0.6 to 0.9, and n=3.5 to 5).

The above-mentioned clay minerals, swelling minerals and the like may be employed singly or in combinations of two or more. A clay mineral, swelling mineral and the like having a crystal structure with a high degree of purity that is regularly stacked along the C-axis is desirable, but mixed-layer minerals in which the crystal period exhibits disorder and various types of crystal structure are mixed together may also be employed.

The organic onium ions employed in the present invention have the structures represented by ammonium ions, phosphonium ions, sulfonium ions, and onium ions derived from aromatic heterocycles. The incorporation of onium ions introduces an organic structure of low intermolecular force between the layers of the negatively charged clay mineral or the like, increasing affinity between the clay mineral or the like and the resin. Examples or organic onium ions are alkyl amine ions such as lauryl amine ions and myristyl amine ions; and ammonium ions comprising both an alkyl group and a glycol group, such as diethylmethyl (polypropyleneoxide)ammonium ions and dimethylbis (polyethyleneglycol)ammonium ions.

Examples of the compounds employed to supply organic onium ions to the layered silicate compound in the present invention are: ammonium ion donors such as tetraethylammonium chloride, n-dodecyltrimethylammonium chloride, and dimethyldistearylammonium chloride; phosphonium ion donors such as ethyltriphenylphosphonium chloride, tetra-n-butylphosphonium bromide, and tetraethylphosphonium bromide; and sulfonium ion donors such as trimethylsulfonium iodide and triphenylsulfonium bromide.

Clay minerals and the like that have been treated with such organic onium ions may be manufactured by the known technique of reacting organic onium ions with a layered clay mineral comprising a negative layer lattice and exchangeable cations (Japanese Examine Patent Publication (KOKOKU) Showa No. 61-5492 and Japanese Unexamined Patent Publication (KOKAI) Showa No. 60-42451).

Examples of nonmagnetic supports suitable for use in the present invention are known biaxially oriented polyethylene naphthalate, polyethylene terephthalate, polyamide, polyimide, polyamidoimide, aromatic polyamide, and polybenzoxidazole. Preferred examples are polyethylene terephthalate, polyethylene naphthalate, and aromatic polyamide. These nonmagnetic supports may be subjected in advance to corona discharge, plasma treatment, adhesion-enhancing treatment, and heat treatment.

The center surface average roughness (JISB0660-1998, ISO4287-1997) on the magnetic layer coating side of the nonmagnetic support suited to use in the present invention is 2 to 10 nm at a cutoff value of 0.25 mm, preferably falling within a range of 3 to 9 nm. The two surfaces of the support may differ in roughness. The preferred thickness of the nonmagnetic support in the magnetic recording medium of the present invention ranges from 3 to 80 $\mu$m.

In the present invention, the method of preparing the nonmagnetic support is not specifically limited, except that fillers having the aspect ratio and thickness mentioned above are added to the resin constructing the support to disperse them. However, the mechanical strength in the longitudinal and width directions is desirably adjusted. Specifically, when forming (manufacturing) a film from the resin in which fillers having the aspect ratio and thickness mentioned above are dispersed, a method of suitably stretching in the longitudinal and width directions is desirably employed. The Young's modulus of the support employed in the present invention is desirably from 4,400 to 15,000 MPa, preferably 5,500 to 11,000 MPa, in both the longitudinal and width directions. The Young's modulus in the longitudinal direction may be different from that in the width direction.

[Magnetic Layer]

In the magnetic recording medium of the present invention, a ferromagnetic hexagonal ferrite powder with an average plate diameter of 5 to 40 nm or a ferromagnetic metal powder with an average major axis length of 20 to 100 nm is desirably employed as the magnetic powder contained in the magnetic layer to achieve high-density recording.

<Ferromagnetic Hexagonal Ferrite Powder>

Ferromagnetic hexagonal ferrite powder has a hexagonal magnetoplumbite structure, extremely high single-axis crystal magnetic anisotropy, and extremely high coercive force (Hc). Thus, the magnetic recording medium in which ferromagnetic hexagonal ferrite powder is employed has good chemical stability, resistance to corrosion, and resistance to friction. Furthermore, a reduction in the magnetic spacing accompanying high densification becomes possible, permitting thinning of the film, and a high C/N ratio and resolution. The average plate diameter of ferromagnetic hexagonal ferrite powder desirably ranges from 5 to 40 nm, preferably from 10 to 38 nm, and more preferably from 15 to 36 nm. Generally, when increasing the track density and reproducing with an MR head, it is necessary to reduce noise and to reduce the average plate diameter of the ferromagnetic hexagonal ferrite powder. From the perspective of reducing the magnetic spacing, as well, the average plate diameter of the hexagonal ferrite is desirably made as small as possible. However, an excessively small average plate diameter in the ferromagnetic hexagonal ferrite powder causes unstable magnetization due to thermal fluctuation. Thus, the lower limit of the average plate diameter of the ferromagnetic hexagonal ferrite powder employed in the magnetic layer of the magnetic recording medium of the present invention is desirably set to 5 nm. At an average plate diameter of equal to or greater than 5 nm, the effects of thermal fluctuation are small and stable magnetization can be achieved. Additionally, the upper limit of the average plate diameter of the ferromagnetic hexagonal ferrite powder is desirably set to 40 nm. An average plate diameter of equal to or less than 40 nm reduces noise, enhances electromagnetic characteristics, and is suited to reproduction with magnetoresistive (MR) heads.

The average plate diameter of the ferromagnetic hexagonal ferrite powder can be determined by photographing the ferromagnetic hexagonal ferrite powder with a transmission electron microscope and directly reading the plate diameter of the ferromagnetic hexagonal ferrite powder from the photograph, or by combining the method of reading plate diameters by tracing a transmission electron microscope photograph with the image analyzer known as the IBASSI made by Karl Zeiss Co. and obtaining an average from the values measured.

Examples of hexagonal ferrite ferromagnetic powders comprised in the magnetic layer in the present invention are various substitution products of barium ferrite, strontium ferrite, lead ferrite, and calcium ferrite, and Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods.

The particle size of the ferromagnetic hexagonal ferrite powder is, as a mean plate diameter as mentioned above, 5 to 40 nm, preferably 10 to 38 nm, more preferably 15 to 36 nm. The mean plate thickness is preferably 1 to 30 nm, more preferably 2 to 25 nm, further preferably 3 to 20 nm. The plate ratio (plate diameter/plate thickness) is preferably 1 to 15, more preferably 1 to 7. If the plate ratio is within a range of 1 to 15, it is possible to achieve adequate orientation properties while maintaining a high filling property in the magnetic layer, as well as to prevent noise increase due to stacking between particles. In addition, the specific surface area by BET method within the above-mentioned particle size is 10 to 200 $m^2/g$, almost corresponding to an arithmetic value from the particle plate diameter and the plate thickness.

For the ferromagnetic hexagonal ferrite particle, narrow distributions of particle plate diameter and plate thickness are normally preferred. Although difficult to render in number form, 500 particles can be randomly measured in a TEM photograph of particles to make a comparison. The distributions of the particle plate diameter and plate thickness are often not a normal distribution. However, when expressed as the standard deviation to the average size, σ/average size= 0.1 to 2.0. The particle producing reaction system is rendered as uniform as possible and the particles produced are subjected to a distribution-enhancing treatment to achieve a sharp particle size distribution. For example, methods such as selectively dissolving ultrafine particles in an acid solution by dissolution are known.

The coercive force (Hc) of the hexagonal ferrite particle can be 159.2 to 238.8 kA/m (2000 to 3000 Oe), preferably 175.1 to 222.9 kA/m (2200 to 2800 Oe), more preferably 183.1 to 214.9 kA/m (2300 to 2700 Oe). However, if the saturation magnetization (σs) of the head exceeds 1.4 T, 159.2 kA/m or more is preferred. The coercive force (Hc) can be controlled by particle size (plate diameter and plate thickness), the types and quantities of elements contained, substitution sites of the element, the particle producing reaction conditions, and the like.

The saturation magnetization (σs) of the hexagonal ferrite particle is 40 to 80 $A \cdot m^2/kg$ (40 to 80 emu/g). The higher saturation magnetization (σs) is preferred, however, it tends to decrease with decreasing particle size. Known methods of improving saturation magnetization (σs) are combining spinel ferrite with magnetoplumbite ferrite, selection of the type and quantity of elements incorporated, and the like. It is also possible to employ W-type hexagonal ferrite. When dispersing the magnetic material, the surface of the magnetic material particles is processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added ranges from 0.1 to 10 weight percent relative to the weight of the magnetic material. The pH of the magnetic material is also important to dispersion. A pH of about 4 to 12 is usually optimum for the dispersion medium and polymer. From the perspective of the chemical stability and storage properties of the medium, a pH of about 6 to 11 can be selected. Moisture contained in the magnetic material also affects dispersion. There is an optimum level for the dispersion medium and polymer, usually selected from the range of 0.01 to 2.0 percent.

Methods of manufacturing the ferromagnetic hexagonal ferrite powder include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to 100° C. or greater; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. However, any manufacturing method can be selected in the present invention. The ferromagnetic hexagonal ferrite powder may be surface treated as necessary with Al, Si, P, an oxide thereof, or the like. The quantity employed desirably ranges from 0.1 to 10 percent of the ferromagnetic powder, and when a surface treatment is conducted, a lubricant such as a fatty acid is desirably adsorbed in a quantity of equal to or less than 100 mg/m$^2$. An inorganic ion in the form of soluble Na, Ca, Fe, Ni, Sr, or the like may be contained in the ferromagnetic powder. These are preferably substantially not contained, but at levels of equal to or less than 200 ppm, characteristics are seldom affected.

<The Ferromagnetic Metal Powder>

It is known that the ferromagnetic metal powder employed in the magnetic layer of the magnetic recording medium of the present invention has good high-density magnetic recording characteristics. The use of ferromagnetic metal powder yields a magnetic recording medium with good electromagnetic characteristics. The average major axis length of the ferromagnetic metal powder employed in the magnetic layer of the magnetic recording medium of the present invention desirably ranges from 20 to 100 nm, preferably from 30 to 90 nm, and more preferably from 40 to 80 nm. Ferromagnetic metal powder with an average major axis length of equal to or greater than 20 nm does not undergo reduction in magnetic characteristics due to thermal fluctuation, and an average major axis length of equal to or less than 100 nm reduces noise and permits the achievement of a good C/N (S/N) ratio.

The average major axis diameter of the ferromagnetic metal powder can be determined by photographing the ferromagnetic metal powder with a transmission electron microscope and directly reading the major and minor axis diameters of the ferromagnetic metal powder from the photograph, or by combining the method of reading major axis diameters by tracing a transmission electron microscope photograph with the image analyzer known as the IBASSI made by Karl Zeiss Co. and obtaining an average from the values measured.

The ferromagnetic metal powder employed in the magnetic layer in the magnetic recording medium of the present invention is not specifically limited with the exception that it contains Fe (containing an alloy) as a main component. Preferred ferromagnetic metal powders are ferromagnetic alloy powders having a main component in the form of α-Fe. In addition to prescribed atoms, the ferromagnetic alloy powder may comprise the following atoms: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. The incorporation of at least one from among Al, Si, Ca, Y, Ba, La, Nd, Co, Ni, and B in addition to α-Fe is desirable. In particular, the incorporation of Co, Al and Y is preferred. More specifically, it is preferred that Co content ranges from 10 to 40 atomic percent, Al content ranges from 2 to 20 atomic percent, and Y content ranges from 1 to 15 atomic percent relative to Fe.

The above-mentioned ferromagnetic metal powders may be pretreated with dispersants, lubricants, surfactants, antistatic agents, and the like prior to dispersion. Further, the ferromagnetic metal powder may comprise a small quantity of water, hydroxides or oxides. The moisture content of the ferromagnetic metal powder desirably ranges from 0.01 to 2 percent; the moisture content of the ferromagnetic metal powder is desirably optimized by means of the type of binder. The pH of the ferromagnetic metal powder is preferably optimized based on the combination of binders employed. The range is normally 6 to 12, preferably 7 to 11. Inorganic ions of soluble Na, Ca, Fe, Ni, Sr, $NH_4$, $SO_4$, Cl, $NO_2$, $NO_3$ and the like are sometimes incorporated into the ferromagnetic powder. These are preferably substantially not contained, but characteristics are not affected when the total quantity of each ion is about equal to or less than 300 ppm. Further, there are desirably few pores in the ferromagnetic metal powder employed in the present invention; the level thereof is equal to or less than 20 volume percent, preferably equal to or less than 5 volume percent.

The crystallite size of the ferromagnetic metal powder desirably ranges from 8 to 20 nm, preferably from 10 to 18 nm, and more preferably from 12 to 16 nm. The crystallite size is the average value obtained by the Scherrer method from the half width of the diffraction peak under conditions of a CuK α1 radiation source, a tube voltage of 50 kV, and a tube current of 300 mA using an X-ray diffraction device (RINT 2000 series made by Rigaku Corporation). The specific surface area ($S_{BET}$) of the ferromagnetic metal powder by the BET method is desirably equal to or greater than 30 m$^2$/g and less than 50 m$^2$/g, preferably from 38 to 48 m$^2$/g. Within this range, it is possible to simultaneously achieve both good surface properties and low noise. The pH of the ferromagnetic metal powder is desirably optimized in combination with the binder employed. The range is from 4 to 12, with from 7 to 10 being preferred. When necessary, the ferromagnetic metal powder may be surface treated with Al, Si, P, an oxide thereof, or the like. The quantity employed is from 0.1 to 10 percent of the ferromagnetic metal powder, it being desirable for adsorption of lubricants such as fatty acids in the application of a surface treatment to be equal to or less than 100 mg/m$^2$.

The shape of the ferromagnetic metal powder may be acicular, granular, rice particle-shaped, or plate-shaped so long as the above-stated characteristics about particle size are satisfied. The use of acicular ferromagnetic powder is particularly preferred. In the case of acicular ferromagnetic metal powder, the acicular ratio is preferably 4 to 12, more preferably 5 to 12. The coercive force (Hc) of the ferromagnetic metal powder preferably ranges from 159.2 to 238.8 kA/m (2,000 to 3,000 Oe), more preferably 167.2 to 230.8 kA/m (2,100 to 2,900 Oe). The saturation magnetic flux density preferably ranges from 150 to 300 T·m (1,500 to 3,000 G), more preferably 160 to 290 T·m (1,600 to 2,900 G). The saturation magnetization (σs) preferably ranges from 140 to 170 A·m$^2$/kg (140 to 170 emu/g), more preferably 145 to 160 A·m$^2$/kg (145 to 160 emu/g).

A ferromagnetic metal powder with a low switching field distribution (SFD) is desirable, with equal to or less than 0.8 being preferred. A SFD of equal to or less than 0.8 affords good electromagnetic characteristics, high output, sharp magnetic reversal, and little peak shift, which is suited to high-density digital magnetic recording. Methods of achieving a low Hc distribution include improving the particle size distribution of goethite in the ferromagnetic metal powder, employing monodisperse αFe$_2$O$_3$, and preventing sintering of particles, and the like.

The ferromagnetic metal powder that is employed may be obtained by known manufacturing methods, examples of which are: reducing iron oxide or water-containing iron oxide that has been treated to prevent sintering with a reducing gas such as hydrogen to obtain Fe or Fe—Co particles; reducing a compound organic acid salt (chiefly a salt of oxalic acid) with a reducing gas such as hydrogen; thermally decomposing a metal carbonyl compound; reduction by adding a reducing agent such as sodium boron hydride, hypophosphite, or hydrazine to the aqueous solution of a ferromagnetic metal; and evaporating a metal in an inert gas at low pressure to obtain micropowder. The ferromagnetic metal powder thus obtained is desirably subjected to a known slow oxidation treatment. The method of reducing iron oxide or water-containing iron oxide with a reducing gas such as hydrogen and controlling the time, temperature, and partial pressure of oxygen-containing gas and inert gas to form an oxide film on the surface is preferred due to low demagnetization.

[Nonmagnetic Layer]

The magnetic recording medium of the present invention comprises a nonmagnetic layer comprising a binder and a nonmagnetic powder beneath the above-mentioned magnetic layer on the nonmagnetic support. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides.

Specifically, titanium oxides such as titanium dioxide, cerium oxide, tin oxide, tungsten oxide, ZnO, ZrO$_2$, SiO$_2$, Cr$_2$O$_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, MgCO$_3$, CaCO$_3$, BaCO$_3$, SrCO$_3$, BaSO$_4$, silicon carbide, and titanium carbide may be employed singly or in combinations of two or more α-iron oxide and titanium oxide are preferred.

The nonmagnetic powder may be acicular, spherical, polyhedral, or plate-shaped. The crystallite size of the nonmagnetic powder desirably ranges from 4 nm to 1 μm, preferably from 40 to 100 nm. A crystallite size falling within a range of 4 nm to 1 μm is desirable in that it facilitates dispersion and imparts a suitable surface roughness. The average particle diameter of the nonmagnetic powder desirably ranges from 5 nm to 2 μm. As needed, nonmagnetic powders of differing average particle diameter may be combined; the same effect may be achieved by broadening the average particle distribution of a single nonmagnetic powder. The preferred average particle diameter of the nonmagnetic powder ranges from 10 to 200 nm. Within a range of 5 nm to 2 μm, dispersion is good and good surface roughness is achieved.

The specific surface area of the nonmagnetic powder desirably ranges from 1 to 100 m$^2$/g, preferably from 5 to 70 m$^2$/g, and more preferably from 10 to 65 m$^2$/g. Within the specific surface area ranging from 1 to 100 m$^2$/g, suitable surface roughness is achieved and dispersion is possible with the desired quantity of binder. Oil absorption capacity using dibutyl phthalate (DBP) desirably ranges from 5 to 100 mL/100 g, preferably from 10 to 80 mL/100 g, and more preferably from 20 to 60 mL/100 g. The specific gravity desirably ranges from 1 to 12, preferably from 3 to 6. The tap density desirably ranges from 0.05 to 2 g/mL, preferably from 0.2 to 1.5 g/mL. A tap density falling within a range of 0.05 to 2 g/mL reduces the amount of scattering particles, thereby facilitating handling, and tends to prevent solidification to the device. The pH of the nonmagnetic powder desirably ranges from 2 to 11, preferably from 6 to 9. When the pH falls within a range of 2 to 11, the coefficient of friction does not become high at high temperature or high humidity or due to the freeing of fatty acids. The moisture content of the nonmagnetic powder desirably ranges from 0.1 to 5 weight percent, preferably from 0.2 to 3 weight percent, and more preferably from 0.3 to 1.5 weight percent. A moisture content falling within a range of 0.1 to 5 weight percent is desirable because it produces good dispersion and yields a stable coating viscosity following dispersion. An ignition loss of equal to or less than 20 weight percent is desirable and nonmagnetic powders with low ignition losses are desirable.

If the nonmagnetic powder is an inorganic powder, the Mohs' hardness is preferably 4 to 10. Durability can be ensured if the Mohs' hardness ranges from 4 to 10. The stearic acid (SA) adsorption capacity of the nonmagnetic powder preferably ranges from 1 to 20 μmol/m$^2$, more preferably from 2 to 15 μmol/m$^2$. The heat of wetting in 25° C. water of the nonmagnetic powder is preferably within a range of 2.0×10$^{-5}$ to 6.0×10$^{-5}$ J/cm$^2$ (200 to 600 erg/cm$^2$). A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 9. The surface of these nonmagnetic powders is preferably treated with Al$_2$O$_3$, SiO$_2$, TiO$_2$, ZrO$_2$, SnO$_2$, Sb$_2$O$_3$, and ZnO. The surface-treating agents of preference with regard to dispersibility are Al$_2$O$_3$, SiO$_2$, TiO$_2$, and ZrO$_2$, and Al$_2$O$_3$, SiO$_2$ and ZrO$_2$ are further preferable. They may be employed singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders suitable for use in the nonmagnetic layer in the present invention are: Nanotite from Showa Denko K. K.; HIT-100 and ZA-G1 from Sumitomo Chemical Co., Ltd.; DPN-250, DPN-250BX, DPN-245, DPN-270BX, DPN-550BX and DPN-550RX from Toda Kogyo Corp.; titanium oxide TTO-51B, TTO-55A, TTO-55B, TTO-55C, TTO-55S, TTO-55D, SN-100, MJ-7, α-iron oxide E270, E271 and E300 from Ishihara Sangyo Co., Ltd.; STT-4D, STT-30D, STT-30 and STT-65C from Titan Kogyo K. K.; MT-100S, MT-100T, MT-150W, MT-500B, MT-600B, MT-100F and MT-500HD from Tayca Corporation; FINEX-25, BF-1, BF-10, BF-20 and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; Y-LOP from Titan Kogyo K. K.; and sintered products of the same. Particular preferable nonmagnetic powders are titanium dioxide and α-iron oxide.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed.

[Binder]

Conventionally known thermoplastic resins, thermosetting resins, reactive resins and mixtures thereof may be employed as binders employed in the magnetic layer and nonmagnetic layer in the present invention. Examples of the thermoplastic resins are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins.

Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. The thermoplastic resins, the thermosetting resins and the reactive resins are described in detail in the *Handbook of Plastics* published by Asakura Shoten.

Further, when an electron beam-curable resin is employed in the magnetic layer, not only coating strength can be improved to improve durability, but also the surface is rendered smooth to enhance electromagnetic characteristics.

The above-described resins may be employed singly or in combination. Of these, the use of polyurethane resin is preferred. In particular, the use of the following polyurethane resin is further preferred; a polyurethane resin prepared by reacting a cyclic compound such as hydrogenated bisphenol A or a polypropylene oxide adduct of hydrogenated bisphenol A, a polyol with a molecular weight of 500 to 5,000 comprising an alkylene oxide chain, a chain-extending agent in the form of a polyol with a molecular weight of 200 to 500 having a cyclic structure, and an organic diisocyanate, as well as introducing a hydrophilic polar group; a polyurethane resin prepared by reacting an aliphatic dibasic acid such as succinic acid, adipic acid, or sebacic acid, a polyester polyol comprised of an aliphatic diol not having a cyclic structure having an alkyl branching side chain such as 2,2-dimethyl-1,3-propanediol, 2-ethyl-2-butyl-1,3-propanediol, 2,2-diethyl-1,3-propanediol, a chain-extending agent such as an aliphatic diol having a branching alkyl side chain with three or more carbon atoms, such as 2-ethyl-butyl-1,3-propanediol, 2,2-diethyl-1,3-propanediol, and an organic diisocyanate, as well as introducing a hydrophilic polar group; and a polyurethane resin prepared by reacting a cyclic structure such as a dimer diol, a polyol compound having a long alkyl chain, and an organic diisocyanate, as well as introducing a hydrophilic polar group.

Examples of polyisocyanates suitable for use in the present invention are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co. Ltd.; and Desmodule L, Desmodule IL, Desmodule N and Desmodule HL manufactured by Sumitomo Bayer Co. Ltd. They can be used singly or in combinations of two or more in each of layers by exploiting differences in curing reactivity.

The average molecular weight of the polyurethane resin comprising a polar group that is employed in the present invention desirably ranges from 5,000 to 100,000, preferably from 10,000 to 50,000. An average molecular weight of equal to or greater than 5,000 is desirable in that it yields a magnetic coating that does not undergo a decrease in physical strength, such as by becoming brittle, and that does not affect the durability of the magnetic recording medium. A molecular weight of equal to or less than 100,000 does not reduce solubility in solvent and thus affords good dispersion. Further, since the coating material viscosity does not become high at defined concentrations, manufacturing properties are good and handling is facilitated.

Examples of the polar group comprised in the above-described polyurethane resins are: —COOM, —SO$_3$M, —OSO$_3$M, —P=O(OM)$_2$, —O—P=O(OM)$_2$ (where M denotes a hydrogen atom or alkali metal base), —OH, —NR$_2$, —N$^+$R$_3$ (where R denotes a hydrocarbon group), epoxy group, —SH, and —CN. At least one of these polar groups may be incorporated by copolymerization or an addition reaction for use. When the polar group-comprising polyurethane resin contains an OH group, a branched OH group is desirable from the perspectives of curing properties and durability. The branched OH group number of 2 to 40 is desirably per molecule, with the presence of 3 to 20 per molecule being preferred. The quantity of such polar groups ranges from $10^{-1}$ to $10^{-8}$ mol/g, preferably from $10^{-2}$ to $10^{-6}$ mol/g.

Specific examples of binders are VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

In the present invention, the quantity of binder employed in the magnetic layer and nonmagnetic layer desirably falls within a range of 5 to 50 weight percent, preferably within a range of 10 to 30 weight percent, of the ferromagnetic powder (ferromagnetic magnetic powder or ferromagnetic hexagonal ferrite powder) or nonmagnetic powder. In the case of a polyurethane resin, it is desirably employed in a quantity of 2 to 20 weight percent, and in the case of polyisocyanate, it is desirably employed in a quantity of 2 to 20 weight percent. It is desirable to employ them together. However, for example, when head corrosion occurs due to the release of trace amounts of chlorine, it is possible to employ just polyurethane or polyurethane and isocyanate. When another resin in the form of vinyl chloride resin is employed, the desirable range is 5 to 30 weight percent. When employing polyurethane in the present invention, the glass transition temperature ranges from −50 to 150° C., preferably from 0 to 100° C. The elongation at break desirably ranges from 100 to 2,000 percent, the stress at break from 0.49 to 98 MPa (0.05 to 10 kg/mm$^2$), and the yield point from 0.49 to 98 MPa (0.05 to 10 kg/mm$^2$).

The magnetic recording medium of the present invention comprises a nonmagnetic layer and at least one magnetic layer. Accordingly, the quantity of binder; the proportion of vinyl chloride resin, polyurethane resin, polyisocyanate, or some other resin in the binder; the molecular weight and quantity of polar groups in the various resins in the magnetic layer; and the physical characteristics of the above-described resins may be varied as needed from the nonmagnetic layer to the individual magnetic layers. They should be optimized for each layer. Known techniques for a multilayered magnetic layer may be applied. For example, when varying the quantity of binder in each layer, the quantity of binder in the magnetic layer may be increased to effectively reduce rubbing damage to the magnetic layer surface, and the quantity of binder in the nonmagnetic layer may be increased to impart flexibility for good head touch.

[Other Additives]

As needed, additives can be added to the magnetic layer or nonmagnetic layer in the present invention. Examples of additives are abrasives, lubricants, dispersion agents, dispersion assistant agents, fungicides, antistatic agents, antioxidatnts, solvents, carbon black and the like.

Examples are molybdenum disulfide; tungsten disulfide; graphite; boron nitride; graphite fluoride; silicone oils; silicones having a polar group; fatty acid-modified silicones; fluorine-containing silicones; fluorine-containing alcohols; fluorine-containing esters; polyolefins; polyglycols; polyphenyl ethers; aromatic ring-containing organic phosphorous acids such as phenylphosphorous acid and their alkali metal salts; alkylphosphorous acids such as octylphosphorous acid and their alkali metal salt; aromatic phosphoric acid esters such as phenylphosphate and their alkali metal salts; alkylphosphoric acid esters such as octylphosphate and their alkali metal salt; alkylsulfonic acid esters and their alkali metal salts; fluorine-containing alkylsulfuric acid esters and their alkali metal salts; monobasic fatty acids with 10 to 24 carbon atoms (which may contain an unsaturated bond or be branched) such as lauric acid and their alkali metal salts; monofatty esters, difatty esters, or polyfatty esters such as butyl stearate comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 22 carbon atoms (which may contain an unsaturated bond or be branched); alkoxy alcohols having 12 to 22 carbon atoms (which may contain an unsaturated bond or be branched) and monoalkyl ethers of alkylene oxide polymers; fatty acid amides comprising 2 to 22 carbon atoms, and fatty acid amines comprising 8 to 22 carbon atoms. Compounds comprising alkyl groups, aryl groups, and aralkyl groups substituted with groups other than the above-mentioned hydrocarbon groups such as nitro groups or hydrocarbon groups containing halogens such as F, Cl, Br, $CF_3$, $CCl_3$, and $CBr_3$ may also be employed. Further, nonionic surfactants such as alkylene oxid-based one, glycerine-based one, glycidol-based one and alkyl phenol ethylene oxide adducts; cationic surfactants such as cyclic amines, ester amides, quaternary ammonium salts, hydantoin derivatives, heterocycles, phosphoniums, and sulfoniums; anionic surfactants such as carboxylic acids, sulfonic acids, sulfuric esters, and other acid group-comprising compounds; and amphoteric surfactants such as amino acids, aminosulfonic acids, sulfuric and phosphoric acid esters of aminoalcohols, and alkyl betaines may also be employed. These surfactants are described in detail in, "A Handbook of Surfactants" (published by Sangyo Tosho K.K.). These additives need not necessarily be pure, and may comprise isomers, unreacted products, side-products, decomposition products, oxides, and other impurities in addition to the principal components. The impurities desirably constitute equal to or less than 30 weight percent, preferably equal to or less than 10 weight percent.

Specific examples of these additives are: NAA-102, hydrogenated castor oil fatty acid, NAA-42, Cation SA, Nymeen L-201, Nonion E-208, Anon BF and Anon LG manufactured by NOF Corporation; FAL-205 and FAL-123 manufactured by Takemoto Oil & Fat Co., Ltd.; NJLUB OL manufactured by New Japan Chemical Co. Ltd.; TA-3 manufactured by Shin-Etsu Chemical Co. Ltd.; Armide P manufactured by Lion Armour Co., Ltd.; Duomine TDO manufactured by Lion Corporation; BA-41G manufactured by Nisshin Oil Mills, Ltd.; and Profan 2012E, Newpole PE61 and Ionet MS-400 manufactured by Sanyo Chemical Industries, Ltd.

Further, in the present invention, carbon black may be admixed to the magnetic layer and nonmagnetic layer to decrease surface resistivity and achieve the desired micro Vicker's hardness. The micro Vicker's hardness normally ranges from 25 to 60 kg/mm$^2$ (0.25 to 0.59 GPa), and preferably from 30 to 50 kg/mm$^2$ (0.29 to 0.49 GPa) to adjust head touch. It can be measured with a thin-film hardness meter (the HMA-400 manufactured by NEC Corporation) using a triangular diamond indenter tip with a front end radius of 0.1 μm and an edge angle of 80 degrees. Examples of carbon blacks suitable for use in the magnetic layer and the nonmagnetic layer are furnace black for rubber, thermal for rubber, black for coloring, and acetylene black. The specific surface area desirably ranges from 5 to 500 m$^2$/g, the DBP oil absorption capacity from 10 to 400 mL/100 g, the particle diameter from 5 to 300 nm, the pH from 2 to 10, the moisture content from 0.1 to 10 percent, and the tap density from 0.1 to 1 g/mL.

Specific examples of types of carbon black suitable for use in the magnetic and nonmagnetic layers in the present invention are: BLACK PEARLS 2000, 1300, 1000, 900, 905, 800, 700 and VULCAN XC-72 from Cabot Corporation; #80, #60, #55, #50 and #35 from Asahi Carbon Co., Ltd.; #3050B, #3150B, #3250B, #3750B, #3950B, #2400B, #2300, #1000, #970B, #950, #900, #850B, #650B, #30, #40, #10B and MA-600 from Mitsubishi Chemical Corporation; CONDUCTEX SC, RAVEN 8800, 8000, 7000, 5750, 5250, 3500, 2100, 2000, 1800, 1500, 1255, 1250, 150, 50, 40, 15 and RAVEN-MT-P from Columbia Carbon Co., Ltd.; and Ketjen Black EC from Lion Akzo Co., Ltd.

The carbon black employed can be surface treated with a dispersing agent or the like, grafted with a resin, or a portion of the surface may be graphite-treated. Further, the carbon black may be dispersed with a binder prior to being added to the magnetic or nonmagnetic coating material. These types of carbon black may be employed singly or in combination. When employing carbon black, the quantity preferably ranges from 0.1 to 30 weight percent with respect to the weight of the magnetic material. In the magnetic layer, carbon black works to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the magnetic layer and the nonmagnetic layer based on the objective and the various characteristics stated above, such as particle size, oil absorption capacity, electrical conductivity, and pH, and be optimized for each layer. *The Carbon Black Handbook* compiled by the Carbon Black Association may be consulted for types of carbon black suitable for use in the magnetic layer of the present invention.

In the present invention, known organic solvent can be employed. The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane. These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention in the magnetic layer and in the nonmagnetic layer. However, the amount added may be varied. The stability of coating is increased by using a solvent with a high surface tension (such as cyclohexanone or dioxane) in the nonmagnetic layer. Specifically, it is important that the arithmetic mean value of the upper layer solvent composition be not less than the arithmetic mean value of the nonmagnetic layer solvent composition. To improve dispersion properties, a solvent having a somewhat strong polarity is desirable. It is desirable that solvents having a dielectric constant equal to or higher than 15 are comprised equal to or higher than 50 percent of the solvent composition. Further, the dissolution parameter is desirably 8 to 11.

Different types and quantities of dispersants, lubricants, and surfactants may be employed as necessary in the magnetic layer and nonmagnetic layer in the present invention. The examples given here are not to be construed as limits. For example, a dispersant imparts adsorptive or bonding properties through polar groups, adsorbing or binding by means of polar groups chiefly to the surface of the ferromagnetic powder in the magnetic layer and chiefly to the surface of the nonmagnetic powder in the nonmagnetic layer. It is thought that once an organic phosphorus compound has been adsorbed, it tends not to desorb from the surface of a metal or metallic compound. Accordingly, since the surface of the ferromagnetic powder (ferromagnetic metal powder and ferromagnetic hexagonal ferrite powder) or the surface of the nonmagnetic powder in the present invention is coated with alkyl groups, aromatic groups, or the like, affinity of the ferromagnetic powder or nonferromagnetic powder for the binder resin component increases and the dispersion stability of the ferromagnetic powder or nonmagnetic powder improves. Further, since lubricants are present in a free state, it is conceivable to employ fatty acids having different melting points in the nonmagnetic layer and magnetic layer to control seepage out onto the surface, employ esters of different melting points and polarity to control seepage out onto the surface, adjust the quantity of surfactant to improve the stability of the coating, and increase the quantity of lubricant in the nonmagnetic layer to improve the lubricating effect. Further, all or a portion of the additives employed in the present invention may be added during any step during the manufacturing of the coating liquid employed for the magnetic layer or nonmagnetic layer. For example, there are cases where additives are admixed with the ferromagnetic powder prior to the kneading step, cases where they are added during the step of kneading the ferromagnetic powder, binder, and solvent, cases where they are added during the dispersion step, cases where they are added following dispersion, and cases where they are added immediately prior to coating.

[Backcoat Layer and Adhesion-Enhancing Layer]

Generally, greater repeat running properties are demanded of magnetic tapes employed in computer data recording than of audio and video tapes. To maintain such high running durability, a backcoat layer can be provided on the reverse side of the nonmagnetic support from the side on which the nonmagnetic layer and magnetic layer are provided. The backcoat layer coating liquid can be prepared by dispersing the binder and granular components such as abrasives and antistatic agents in an organic solvent. Various inorganic pigments and carbon black may be employed as granular components. Nitrocellulose, phenoxy resin, vinyl chloride resin, polyurethane, and other resins may be employed singly or in combination as the binder.

An undercoating layer may be provided on the surface coated with a magnetic layer coating liquid and a backcoat layer coating liquid to increase the adhesive strength between the nonmagnetic support and the magnetic layer and/or the nonmagnetic lower layer and a backcoat layer, and to enhance the smoothness of the magnetic layer and backcoat layer surfaces.

A solvent-soluble substance may be employed as a binder in the undercoating layer: such as polyester resin, polyamide resin, polyamidoimide resin, polyurethane resin, vinyl chloride resin, vinylidene chloride resin, phenol resin, epoxy resin, urea resin, melamine resin, formaldehyde resin, silicone resin, starch, modified-starch resin, alginic acid compounds, casein, gelatin, pullulan, dextran, chitin, chitosan, rubber latex, gum Arabic, funori, natural gum, dextrin, modified cellulose resin, polyvinyl alcohol resin, polyethylene oxide, polyacrylic acid-based resin, polyvinyl pyrrolidone, polyethyleneimine, polyvinyl ether, polymaleic acid copolymers, polyacrylamide, and alkyd resins.

The undercoating layer is not specifically limited other than that it be from 0.01 to 3.0 $\mu$m in thickness, with a thickness of 0.05 to 2.0 μm being preferred and thickness of 0.1 to 1.5 μm being of even greater preference. The glass transition temperature of the resin employed in the undercoating layer desirably ranges from 30 to 120° C., and preferably from 40 to 80° C. Blocking does not occur along edge surfaces at equal to or greater than 0° C., and at equal to or less than 120° C., internal stress in the smooth layer is moderated and adhesive strength is good.

[The Layer Structure]

In the magnetic recording medium of the present invention, at least two layers of coating film, that is, a nonmagnetic layer and a magnetic layer over the nonmagnetic layer, are provided on at least one surface of a nonmagnetic support. The magnetic layer may comprise two or more layers as needed. Further, a backcoat layer is provided as needed on the surface of the reverse side of the nonmagnetic support. Still further, lubricating coated films and various coated films for protecting the magnetic layer may be provided as needed on the magnetic layer in the magnetic recording medium of the present invention. Still further, undercoating layers (adhesion-enhancing layers) may be provided between the nonmagnetic support and nonmagnetic layers to improve adhesion between coated films and the nonmagnetic support.

A magnetic layer and a nonmagnetic layer may be provided on one or both sides of the nonmagnetic support in the magnetic recording medium of the present invention. The nonmagnetic layer (lower layer) and magnetic layer (upper layer) may be provided in such a manner that the lower layer is applied first, with the upper layer being applied while the lower layer is still wet (W/W), or the lower layer may be dried before applying the upper magnetic layer (W/D). Simultaneous or sequential wet coating is preferred from the perspective of production efficiency, but in the case of disks, coating following drying is fully possible. In the multilayer configuration of the present invention, since the upper layer and lower layer can be simultaneously formed by simultaneous or sequential wet coating (W/W), a surface treatment step such as calendering can be effectively utilized to improve the surface roughness of the upper magnetic layer even in the case of ultrathin layers.

In the present invention, the thickness of the nonmagnetic support desirably ranges from 3 to 80 μm. In computer tapes, a nonmagnetic support having a thickness of 3.5 to 7.5 μm, preferably from 3 to 7 μm, can be employed. Further, when providing an undercoating layer between the nonmagnetic support and a nonmagnetic layer or a magnetic layer, the thickness of the undercoating layer is desirably from 0.01 to 0.8 μm, preferably from 0.02 to 0.6 μm. Further, when providing a backcoat layer on the reverse side from the side on which the nonmagnetic layer and the magnetic layer is provided on the nonmagnetic support, the thickness thereof is desirably from 0.1 to 1.0 μm, preferably from 0.2 to 0.8 μm.

The thickness of the magnetic layer is optimized based on the saturation magnetization level and head gap length of the magnetic head employed and the recording signal band, but is generally from 10 to 100 nm, preferably from 20 to 80 nm, and more preferably from 30 to 80 nm. Further, the thickness fluctuation rate of the magnetic layer is desirably within ±50 percent, preferably within ±40 percent. The magnetic layer comprises at least one layer, but may be separated into two or more layers having different magnetic characteristics. Known multilayer magnetic layer configurations may be employed.

The thickness of the nonmagnetic layer is desirably 0.02 to 3.0 μm, preferably from 0.05 to 2.5 μm, and more preferably, from 0.1 to 2.0 μm. In the magnetic recording medium of the present invention, the nonmagnetic layer can effectively function so long as it is essentially nonmagnetic. For example, even when an impurity or an intentional trace amount of magnetic material is contained, the effect of the present invention is exhibited and the configuration can be seen as being essentially identical to that of the magnetic recording medium of the present invention. The term "essentially identical" means that the residual magnetic flux density of the nonmagnetic layer is equal to or less than 10 T·m (100 G) or the coercive force is equal to or less than 7.96 kA/m (100 Oe), with the absence of a residual magnetic flux density and coercive force being preferred.

[Physical Characteristics]

In the magnetic recording medium of the present invention, the saturation magnetic flux density of the magnetic layer is desirably from 100 to 300 T·m (1,000 to 3,000 G). The coercive force (Hr) of the magnetic layer is desirably from 143.3 to 318.4 kA/m (1,800 to 4,000 Oe), preferably from 159.2 to 278.6 kA/m (2,000 to 3,500 Oe). The coercive force distribution is desirably narrow, with the SFD and SFDr being equal to or less than 0.6, preferably equal to or less than 0.2.

The coefficient of friction of the magnetic recording medium of the present invention with the head is desirably equal to or less than 0.5, preferably equal to or less than 0.3, over a temperature range of −10 to 40° C. and a humidity range of 0 to 95 percent. Specific surface resistivity is preferably from $10^4$ to $10^{12}$ Ω/sq on the magnetic surface, and the charge potential is desirably within a range of −500 to +500 V. The modulus of elasticity at 0.5 percent elongation of the magnetic layer is desirably from 0.98 to 19.6 GPa (100 to 2,000 kg/mm$^2$) in all in-plane directions. The breaking strength is desirably from 98 to 686 MPa (10 to 70 kg/mm$^2$). The modulus of elasticity of the magnetic recording medium is desirably from 0.98 to 14.7 GPa (100 to 1,500 kg/mm$^2$) in all in-plane directions. The residual elongation is desirably equal to or less than 0.5 percent. The thermal shrinkage rate at any temperature equal to or less than 100° C. is desirably equal to or less than 1 percent, preferably equal to or less than 0.5 percent, and more preferably equal to or less than 0.1 percent.

The glass transition temperature of the magnetic layer (the peak loss elastic modulus of dynamic viscoelasticity measured at 110 Hz) is desirably from 50 to 180° C., and that of the nonmagnetic layer is desirably from 0 to 180° C. The loss elastic modulus desirably falls within a range of $1 \times 10^7$ to $8 \times 10^8$ Pa ($1 \times 10^8$ to $8 \times 10^9$ dyne/cm$^2$) and the loss tangent is desirably equal to or less than 0.2. Excessive high loss tangent tends to cause a adhesion failure. These thermal and mechanical characteristics are desirably identical to within 10 percent in all in-plane directions of the medium.

The residual solvent contained in the magnetic layer is desirably equal to or less than 100 mg/m$^2$, preferably equal to or less than 10 mg/m$^2$. The void rate of the coated layer is desirably equal to or less than 30 volume percent, preferably equal to or less than 20 volume percent, in both the nonmagnetic and magnetic layers. A low void rate is desirable to achieve high output, but there are objectives for which ensuring a certain value is good. For example, in disk media in which repeat applications are important, a high void rate is often desirable for running durability.

The maximum height $SR_{max}$ of the magnetic layer is desirably equal to or less than 0.5 μm. The ten-point average roughness SRz is desirably equal to or less than 0.3 μm. The center surface peak SRp is desirably equal to or less than 0.3 μm. The center surface valley depth SRv is desirably equal to or less than 0.3 μm. The center surface surface area SSr is desirably from 20 to 80 percent. And the average wavelength SλA is desirably from 5 to 300 μm. These can be readily controlled by controlling the surface properties by means of fillers employed in the support and the surface shape of the rolls employed in calendering. Curling is desirably within ±3 mm.

In the magnetic recording medium of the present invention, it is possible to vary the physical characteristics between the nonmagnetic layer and the magnetic layer based on the objective. For example, while increasing the modulus of elasticity of the magnetic layer to improve running durability, it is possible to make the modulus of elasticity of the nonmagnetic layer lower than that of the magnetic layer to enhance contact between the magnetic recording medium and the head.

[Manufacturing Method]

The process of manufacturing the magnetic layer coating liquid and nonmagnetic layer coating liquid of the magnetic recording medium of the present invention comprises at least a kneading step, dispersion step, and mixing steps provided as needed before and after these steps. Each of the steps may be divided into two or more stages. All of the starting materials employed in the present invention, including the ferromagnetic hexagonal ferrite powder or ferromagnetic metal powder, nonmagnetic powder, benzenesulfonic acid derivatives, π electron conjugate-type conductive polymers, binder, carbon black, abrasives, antistatic agents, lubricants, and solvents may be added at the beginning or during any step. Further, each of the starting materials may be divided and added during two or more steps. For example, polyurethane may be divided up and added during the kneading step, dispersion step, and mixing step for viscosity adjustment following dispersion. To achieve the object of the present invention, conventionally known manufacturing techniques may be employed for some of the steps. A kneading device of high kneading strength such as an open kneader, continuous kneader, pressure kneader, or extruder is desirably employed in the kneading step. When a kneader is employed, all or a portion (with equal to or greater than 30 percent of the total binder being desirable) of the magnetic powder or nonmagnetic powder and binder can be kneaded in a proportion of 15 to 500 parts by weight per 100 parts by weight of magnetic material. The details of the kneading process are described in detail in Japanese Unexamined Patent Publication (KOKAI) Heisei Nos. 1-106338 and 1-79274. Further, glass beads may be employed to disperse the magnetic layer coating liquid and nonmagnetic coating liquid. A dispersion medium having a high specific gravity such as zirconia beads, titania beads, or steel beads is suitable for use as the glass beads. The particles diameter and fill rate of the dispersion medium are optimized for use. A known dispersing machine may be employed.

In the method of manufacturing the magnetic recording medium of the present invention, the magnetic layer coating liquid can be coated to a prescribed film thickness on a nonmagnetic layer that has been provided on a nonmagnetic support, to form a magnetic layer. In this process, multiple magnetic layer coating liquids can be sequentially or simultaneously multilayer coated, and the nonmagnetic layer coating liquid and magnetic layer coating liquid can be sequentially or simultaneously multilayer coated. Coating machines suitable for use in coating the magnetic and nonmagnetic coating materials mentioned above are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center K.K. may be referred to in this regard.

In the case of a magnetic tape, the layer formed by coating the magnetic layer coating liquid is magnetically oriented in the longitudinal direction using a cobalt magnet or solenoid on the ferromagnetic powder contained in the layer formed by coating the magnetic layer coating liquid. In the case of a disk, although isotropic orientation can be adequately achieved without orientation using an orientation device, the positioning of cobalt magnets at mutually oblique angles or the use of a known random orientation device such as the application of an alternating current magnetic field with solenoids is desirably employed. In the case of ferromagnetic metal powder, the term "isotropic orientation" generally desirably means two-dimensional in-plane randomness, but can also mean three-dimensional randomness when a vertical component is imparted. In the case of hexagonal ferrite, three-dimensional randomness in the in-plane and vertical directions is generally readily achieved, but two-dimensional in-plane randomness is also possible. A known method such as magnets with opposite poles opposed may be employed to impart isotropic magnetic characteristics in a circumferential direction using a vertical orientation. Vertical orientation is particularly desirable in the case of high-density recording. Further, spin coating may be employed to achieve circumferential orientation.

The temperature and flow rate of drying air and the coating rate are desirably determined to control the drying position of the coated film. The coating rate is desirably from 20 m/min to 1,000 m/min and the temperature of the drying air is desirably equal to or greater than 60° C. It is also possible to conduct suitable predrying before entry into the magnet zone.

Following drying, a surface smoothing treatment is applied to the coated layer. For example, supercalender rolls are employed in the surface smoothing treatment. The surface smoothing treatment eliminates holes produced by the removal of solvent during drying and improves the fill rate of ferromagnetic powder in the magnetic layer, making it possible to obtain a magnetic recording medium of high electromagnetic characteristics. Heat-resistant plastic rolls such as epoxy, polyimide, polyamide, and polyamidoimide rolls may be employed as the calendering rolls. Processing with metal rolls is also possible. The magnetic recording medium of the present invention desirably has an extremely smooth surface such that the center surface average roughness is 0.1 to 4 nm, preferably 1 to 3 nm at a cutoff value of 0.25 mm. For example, this is achieved by subjecting a magnetic layer formed by selecting a specific ferromagnetic powder and binder such as have been set forth above to the above-described calendering. Calendering is desirably conducted under conditions of a calendering roll temperature falling within a range of 60 to 100° C., preferably within a range of 70 to 100° C., and more preferably within a range of 80 to 100° C., at a pressure falling within a range of 100 to 500 kg/cm, preferably within a range of 200 to 450 kg/cm, and more preferably within a range of 300 to 400 kg/cm.

Means of reducing the thermal shrinkage rate include heat treatment in a web-shape while handling at low tension and heat treatment (thermo processing) with the tape in bulk or in a stacked state such as wound on a cassette. Both may be employed; from the perspective of achieving a magnetic recording medium of high output and low noise, thermo processing is desirable.

The magnetic recording medium obtained can be cut to desired size with a cutter or the like for use.

[Embodiments]

The present invention is described in greater detail below through embodiments. The components, proportions, operations, sequences, and the like indicated in the embodiments can be modified without departing from the spirit or scope of the present invention, and are not to be construed as being limited to the embodiments below. Further, unless specifically indicated otherwise, the "parts" indicated in the embodiments refer to parts by weight.

PREPARATION EXAMPLE 1

A 4 g quantity of montmorillonite (Kunipia F made by Kunimine Kogyo K.K.) was dispersed in 200 mL of water. To this, 2.5 g of n-dodecyltrimethylammonium chloride were added, and the components were dispersed for 1 hour in a homomixer. The mixture was filtered by being drawn through a membrane filter while being thoroughly washed with water, and then dried under vacuum for 24 hours at 100° C., yielding montmorillonite (A) coated with an organic ammonium salt.

A 1.6 mol quantity of ethylene glycol was admixed per mol of terephthalic acid, and the above-mentioned montmorillonite (Kunipia F made by Kunimine Kogyo K.K.) that had been coated with an organic compound was added in a proportion of two parts by weight per 100 parts by weight of the polymer being theoretically produced. A reaction was conducted for 2 hours at 255° C. to produce an oligomer comprised primarily of bishydroxyethyl terephthalate. Subsequently, a catalyst in the form of antimony trioxide was added in a molar proportion of 100 ppm relative to the terephthalic acid and a reaction was conducted for 4 hours at 275° C. under reduced pressure. Polymer melt was discharged through the collection outlet. This was cooled and cut into pellets.

The pellets were dried for 10 hours at 80° C., charged to an extruder, melted by heating to 270° C., extruded in sheet form through the orifice of a T-die, wound onto a cooling drum with a surface temperature of 10° C., and cooled to prepare an unstretched film 60 μm in thickness. Next, the unstretched film was longitudinally stretched three-fold with rolls at a stretching temperature of 90° C., transversely stretched 3.3-fold with a tenter, and heat treated at 230° C. at 5 percent relaxation, yielding a polyethylene terephthalate film (PET-A) 6 μm in thickness.

PREPARATION EXAMPLE 2

With the exception that 2,6-naphthalenic acid was employed instead of terephthalic acid, polyethylene-2,6-naphthalate pellets were prepared in the same manner as in Preparation Example 1 above. A polyethylene naphthalate film (PEN-A) was then obtained with the same filler added and the same condition as in Preparation Example 1 except for changing the melt temperature to 290° C.
(Embodiment 1)

Preparation of magnetic layer coating liquid

| | |
|---|---|
| Ferromagnetic acicular metal powder | 100 parts |
| Composition: Fe/Co/Al/Y = 68/20/7/5 | |
| Surface treatment agent: $Al_2O_3$, $Y_2O_3$ | |
| Coercive force (Hc): 199 kA/m (2,500 Oe) | |
| Crystallite size: 130 Å | |
| Major axis diameter: 65 nm | |
| Acicular ratio: 6 | |
| Specific surface area by BET method: 46 m$^2$/g | |
| Saturation magnetization (σs): 150 m$^2$/kg (150 emu/g) | |
| Polyurethane resin | 12 parts |
| Branched side chain-containing polyester polyol/ | |
| diphenylmethane diisocyanate type, | |
| Hydrophilic polar group: —$SO_3Na$ content is 70 eq/ton. | |
| Phenylphosphorous acid | 3 parts |
| α-$Al_2O_3$ (particle size: 0.15 μm) | 2 parts |
| Carbon black (particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |
| Preparation of nonmagnetic layer coating liquid | |
| Nonmagnetic inorganic powder | 85 parts |
| α-iron oxide | |
| Surface treatment agent: $Al_2O_3$, $SiO_2$ | |
| Major axis diameter: 0.15 μm | |
| Tap density: 0.8 g/ml | |
| Acicular ratio: 7 | |
| Specific surface area by BET method: 52 m$^2$/g | |
| pH: 8 | |
| DBP oil absorption capacity: 33 g/100 g | |
| Carbon black | 20 parts |
| DBP oil absorption capacity: 120 ml/100 g | |
| pH: 8 | |
| Specific surface area by BET method: 250 m$^2$/g | |
| Volatile content: 1.5 percent | |
| Polyurethane resin | 12 parts |
| Branched side chain-containing polyester polyol/ | |
| diphenylmethane diisocyanate type, | |
| Hydrophilic polar group: —$SO_3Na$ content is 70 eq/ton. | |
| Acrylic resin | 6 parts |
| Benzyl methacrylate/diacetone acrylamide type, | |
| Hydrophilic polar group: —$SO_3Na$ content is 60 eq/ton. | |
| Phenylphosphorous acid | 3 parts |
| α-$Al_2O_3$ (mean particle diameter: 0.2 μm) | 1 part |
| Cyclohexanone | 140 parts |
| Methyl ethyl ketone | 170 parts |
| Butyl stearate | 2 parts |
| Stearic acid | 1 part |

The individual components of the above-described composition of the magnetic layer coating liquid and composition of the nonmagnetic layer coating liquid were kneaded for 60 min in an open kneader and then dispersed for 120 min in a sand mill. Six parts of trifunctional low-molecular-weight polyisocyanate compound (Coronate 3041 made by Nippon Polyurethane Co., Ltd.) were added to the dispersions obtained, mixing was conducted for a further 20 min with stirring, and the mixtures were filtered through a filter having an average pore diameter of 1 μm to prepare a magnetic layer coating liquid and a nonmagnetic layer coating liquid. The above-described nonmagnetic layer coating liquid was then coated in a quantity calculated to yield a dry thickness of 1.8 μm and immediately thereafter, the above-described magnetic layer coating liquid was coated in a quantity calculated to yield a dry thickness of 0.2 μm by a simultaneous multilayer coating on the polyethylene terephthalate film support (PET-A) prepared in Preparation Example 1. While the two layers were still wet, magnetic orientation was conducted with a 300 μm (3000 gauss) magnet, the layers were dried, surface smoothing treatment was conducted at 90° C. at a linear pressure of 300 kg/cm at a rate of 100 m/min with a seven-stage calender comprised solely of metal rolls, a heat treatment was conducted at 70° C. for 48 hours, and the film was slit to a ½-inch width to prepare magnetic tape.
(Embodiments 2 to 4)

With the exception that the dispersion time of the filler added during the preparation of the nonmagnetic support was changed, as indicated in Table 1, magnetic tapes were prepared by the same method as in Embodiment 1.

COMPARATIVE EXAMPLE 1

With the exception that the type of filler added during the preparation of the nonmagnetic support was changed, as indicated in Table 1, magnetic tape was prepared by the same method as in Embodiment 1.

Preparation of Magnetic Layer Coating Liquid

| Preparation of magnetic layer coating liquid | |
|---|---|
| Ferromagnetic plate-shaped hexagonal ferrite powder | 100 parts |
| Composition (molar ratio): Ba/Fe/Co/Zn = 1/11/0.2/0.8 | |
| Coercive force (Hc): 195 kA/m (2,450 Oe) | |
| Plate diameter: 26 nm | |
| Plate ratio: 3 | |
| Specific surface area by BET method: 50 m$^2$/g | |
| Saturation magnetization ($\sigma$s): 60 A · m$^2$/kg (60 emu/g) | |
| Polyurethane resin | 12 parts |
| Branched side chain-containing polyester polyol/ | |
| diphenylmethane diisocyanate type, | |
| Hydrophilic polar group: —SO$_3$Na content is 70 eq/ton. | |
| Phenylphosphorous acid | 3 parts |
| $\alpha$-Al$_2$O$_3$ (particle size: 0.15 $\mu$m) | 2 parts |
| Carbon black (particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |

Each component of the above-described magnetic layer coating liquid was prepared by the same method as in Embodiment 1 to obtain a magnetic layer coating liquid. A nonmagnetic coating liquid identical to that in Embodiment 1 was coated in a quantity calculated to yield a dry thickness of 1.8 $\mu$m, and immediately thereafter, the above-described magnetic layer coating liquid was coated in a quantity calculated to yield a dry thickness of 0.2 $\mu$m by a simultaneous multilayer coating on the polyethylene naphthalate film support (PEN-A) prepared in Preparation Example 2. While the two layers were still wet, random orientation was conducted by passing the layers through two field intensity alternating current magnetic field generators with a frequency of 50 Hz and a magnetic field intensity of 25 T·m (250 gauss) and a frequency of 50 Hz and a magnetic field intensity of 12 T·m (120 gauss), respectively. Following drying, the film was treated with a seven-stage calender at a temperature of 90° C. and linear pressure of 300 kg/cm, and a heat treatment was conducted at 70° C. for 48 hours. The film was then punched to 3.7 inches, surface polished, and inserted into a 3.7-inch Zip-disk cartridge provided with internal liner. Prescribed mechanical parts were then added to obtain a 3.7-inch flexible disk.

(Embodiments 6–8)

With the exception that the dispersion time of the filler added during the preparation of the nonmagnetic support was changed, as indicated in Table 2, magnetic disks were prepared by the same method as in Embodiment 5.

COMPARATIVE EXAMPLE 2

With the exception that the type of filler added during the preparation of the nonmagnetic support was changed, as indicated in Table 2, magnetic disks were prepared by the same method as in Embodiment 5.

<Measurement Methods>

Measurement of the Thickness and Aspect Ratio of the Filler in the Support

The film containing the particles to be measured that had been stretched 3.2-fold at least longitudinally or transversely was sliced with a microtome, and the sample was observed at 20,000 to 30,000-fold magnification with a transmission electron microscope (TEM Model H-800) made by Hitachi, Ltd. The particle diameter (plate diameter) and thickness of at least 30 particles visible in the sample were measured, and the ratio thereof was adopted as the aspect ratio.

Measurement of the Error Rate (Initial and at Elevated Humidity and Temperature)

A recording signal was recorded on a magnetic tape in 8–10 conversion PR1 equalization mode and on a flexible disk in (2, 7) RLL modulation mode at a temperature of 23° C. at 50 percent relative humidity, and the various measurements were conducted under environments of 23° C. and 50 percent RH, and 50° C. and 80 percent RH.

TABLE 1

| | Type of nonmagnetic support | Filler | | | Major axis length of magnetic material nm | Crystallite size Å |
|---|---|---|---|---|---|---|
| | | Dispersion time (hr.) | Thickness nm | Aspect ratio | | |
| Embodiment 1 | PET-A | 1.0 | 1.7 | 1000 | 60 | 130 |
| Embodiment 2 | PET-B | 1.5 | 1.5 | 500 | 60 | 130 |
| Embodiment 3 | PET-C | 2.0 | 1.2 | 250 | 60 | 130 |
| Embodiment 4 | PET-D | 4.0 | 1.1 | 100 | 60 | 130 |
| Comp. Ex. 1 | PET-e | 0.0 | 100 | 1 | 60 | 130 |

| | Magnetic material composition | | | Magnetic material characteristics | | | Error rate | |
|---|---|---|---|---|---|---|---|---|
| | Co AT % | Al AT % | Y AT % | Hc kA/m | $\sigma$s A · m$^2$/kg | S$_{BET}$ m$^2$/g | 23° C., 50% × 10$^{-5}$ | 50° C., 80% × 10$^{-5}$ |
| Embodiment 1 | 20 | 7 | 5 | 199 | 145 | 48 | 0.06 | 0.08 |
| Embodiment 2 | 20 | 7 | 5 | 199 | 145 | 48 | 0.04 | 0.06 |
| Embodiment 3 | 20 | 7 | 5 | 199 | 145 | 48 | 0.03 | 0.03 |
| Embodiment 4 | 20 | 7 | 5 | 199 | 145 | 48 | 0.03 | 0.03 |
| Comp. Ex. 1 | 20 | 7 | 5 | 199 | 145 | 48 | 0.08 | 0.09 |

TABLE 2

| | Type of nonmagnetic support | Filler Dispersion time (hr.) | Filler Thickness nm | Filler Aspect ratio | Plate diameter of magnetic material nm |
|---|---|---|---|---|---|
| Embodiment 5 | PEN-A | 1.0 | 1.7 | 1000 | 26 |
| Embodiment 6 | PEN-B | 1.5 | 1.5 | 500 | 26 |
| Embodiment 7 | PEN-C | 2.0 | 1.2 | 250 | 26 |
| Embodiment 8 | PEN-D | 4.0 | 1.1 | 100 | 26 |
| Comp. Ex. 2 | PEN-e | 0.0 | 100 | 1 | 26 |

| | magnetic material composition: molar ratio (Ba = 1) | | | Magnetic material characteristics | | | Error rate | |
|---|---|---|---|---|---|---|---|---|
| | | | | Hc | σs | $S_{BET}$ | 23° C., 50% × | 50° C., 80% × |
| | Fe | Co | Zn | kA/m | A · m²kg | m²g | $10^{-5}$ | $10^{-5}$ |
| Embodiment 5 | 9.0 | 0.2 | 0.8 | 191 | 60 | 50 | 0.60 | 0.64 |
| Embodiment 6 | 9.0 | 0.2 | 0.8 | 191 | 60 | 50 | 0.50 | 0.68 |
| Embodiment 7 | 9.0 | 0.2 | 0.8 | 191 | 60 | 50 | 0.45 | 0.49 |
| Embodiment 8 | 9.0 | 0.2 | 0.8 | 191 | 60 | 50 | 0.40 | 0.41 |
| Comp. Ex. 2 | 9.0 | 0.2 | 0.8 | 191 | 60 | 50 | 0.90 | 1.70 |

Evaluation of Results

The magnetic tapes of Embodiments 1 to 4 and the flexible disks of Embodiments 5 to 8, which comprised filler having a thickness of 0.5 to 5 nm and an aspect ratio of 50 to 10,000 in the support, all exhibited low error rates. Further, the magnetic tapes and flexible disks of the Embodiments showed little increase in error rate under elevated temperature and humidity and afforded good running durability.

By contrast, the magnetic tape of Comparative Example 1 and the flexible disk of Comparative Example 2, which contained filler in the nonmagnetic support that had a thickness outside the range of 0.5 to 5 nm and an aspect ratio outside the range of 50 to 10,000, had higher error rates than the magnetic tapes and flexible disks of the Embodiments.

The present invention provides a magnetic recording medium affording low noise, a good C/N ratio, and a stable and low error rate. Further, in addition to being suited to recording and reproduction systems employing magnetoresistive (MR) heads, the magnetic recording medium of the present invention maintains a high C/N and a low error rate even in the high-density recording range, and affords good running durability.

The present disclosure relates to the subject matter contained in Japanese Patent Application No. 2002-113869 filed on Apr. 16, 2002, which is expressly incorporated herein by reference in its entirety.

What is claimed is:

1. A magnetic recording medium comprising a nonmagnetic layer comprising a nonmagnetic powder and a binder and a magnetic layer comprising a ferromagnetic powder and a binder in this order on at least one surface of a nonmagnetic support, wherein said nonmagnetic support comprises a filler having an aspect ratio ranging from 50 to 10,000 and a thickness ranging from 0.5 to 5 nm.

wherein said ferromagnetic powder is a ferromagnetic hexagonal ferrite powder having an average plate diameter ranging from 5 to 40 nm or a ferromagnetic metal powder having an average major axis length ranging from 20 to 100 nm, and wherein said filler is a clay mineral or swelling mineral that has been subjected to the action of an organic onium ion.

2. The magnetic recording medium according to claim 1, wherein said filler has an aspect ratio ranging from 60 to 5,000.

3. The magnetic recording medium according to claim 1, wherein said filler has an aspect ratio ranging from 70 to 1,000.

4. The magnetic recording medium according to claim 1, wherein said filler has a thickness ranging from 0.7 to 4 nm.

5. The magnetic recording medium according to claim 1, wherein said filler has a thickness ranging from 0.8 to 2 nm.

6. The magnetic recording medium according to claim 1, wherein said clay mineral or swelling mineral is smectite clay, swelling mica or swelling vermiculite.

7. The magnetic recording medium according to claim 6, wherein said smectite clay is montmorillonite, beidellite, nontronite, saponite, iron saponite, hectorite, sorconite, stibnite, bentonite, substitution products thereof, derivatives thereof, or mixtures thereof.

8. The magnetic recording medium according to claim 8, wherein said swelling mica is Li-type tenorite, Na-type tenorite, Li-type tetrasilicon mica, and Na-type tetrasilicon mica, substitution products thereof, derivatives thereof, or mixtures thereof.

9. A method of reproduction with a magnetoresistive (MR) head, wherein the reproduction is conducted on the magnetic recording medium according to claim 1.

* * * * *